(12) United States Patent
Sitters et al.

(10) Patent No.: US 12,013,341 B2
(45) Date of Patent: Jun. 18, 2024

(54) MICROSCOPY METHOD AND SYSTEM

(71) Applicant: LUMICKS DSM HOLDING B.V., Amsterdam (NL)

(72) Inventors: Gerrit Sitters, Amsterdam (NL); Mattijs De Groot, Amsterdam (NL)

(73) Assignee: LUMICKS DSM HOLDING B.V. (NL)

( * ) Notice: Subject to any disclaimer, the term of this patent is extended or adjusted under 35 U.S.C. 154(b) by 448 days.

(21) Appl. No.: 17/311,182

(22) PCT Filed: Dec. 17, 2019

(86) PCT No.: PCT/NL2019/050845
§ 371 (c)(1),
(2) Date: Jun. 4, 2021

(87) PCT Pub. No.: WO2020/130812
PCT Pub. Date: Jun. 25, 2020

(65) Prior Publication Data
US 2021/0372928 A1 Dec. 2, 2021

(30) Foreign Application Priority Data

Dec. 17, 2018 (NL) .................... 2022223

(51) Int. Cl.
*G01N 21/64* (2006.01)
*G02B 21/00* (2006.01)
(Continued)

(52) U.S. Cl.
CPC ..... *G01N 21/6458* (2013.01); *G02B 21/0076* (2013.01); *G02B 21/008* (2013.01);
(Continued)

(58) Field of Classification Search
CPC .......... G01N 21/6458; G01N 21/6456; G02B 21/0036; G02B 21/0076; G02B 21/008; G02B 21/06; G02B 21/16; G02B 21/26
See application file for complete search history.

(56) References Cited

U.S. PATENT DOCUMENTS

RE43,702 E * 10/2012 Wolleschensky .... G02B 21/248
359/385
8,686,363 B1 * 4/2014 Timlin ............... G02B 21/0032
250/339.07
(Continued)

FOREIGN PATENT DOCUMENTS

DE 102016117096 A1 3/2017
EP 3159676 A1 4/2017
WO 2017153430 A1 9/2017

OTHER PUBLICATIONS

International Search Report and Written Opinion for corresponding International application No. PCT/NL2019/050845; dated Mar. 6, 2020 (18 pages).
(Continued)

*Primary Examiner* — Dani Fox
*Assistant Examiner* — Soorena Kefayati
(74) *Attorney, Agent, or Firm* — Mendelsohn Dunleavy, P.C.

(57) ABSTRACT

A method of excitation microscopy, in particular STimulated Emission Depletion (STED) microscopy, ins provided which comprises: providing a sample; trapping an object in the sample at a trapping position, in particular by applying a position dependent trapping force to the object; positioning, in particular focusing, a depletion beam at an interaction position in the sample for illumination of a portion of the sample associated with the trapped object. The method comprises at least one of controlling the depletion beam such that, at least when the depletion beam is positioned at
(Continued)

the interaction position, an optical force exerted by the depletion beam on the object causes a displacement of the object less than the optical resolution, preferably less than half the optical resolution of an imaging system for observing a STED fluorescence; and controlling at least one of the depletion beam and the trapping force on the object such that, at least when the depletion beam is positioned at the interaction position, an optical force exerted by the depletion beam on the object is less than 5% of the trapping force, preferably less than 3%, more preferably less than 1%. An according system is also provided.

20 Claims, 5 Drawing Sheets

(51) Int. Cl.
G02B 21/06 (2006.01)
G02B 21/16 (2006.01)
G02B 21/26 (2006.01)
(52) U.S. Cl.
CPC ............. *G02B 21/06* (2013.01); *G02B 21/16* (2013.01); *G02B 21/26* (2013.01); *G02B 21/0036* (2013.01)

(56) References Cited

U.S. PATENT DOCUMENTS

| 8,755,116 | B2* | 6/2014 | Kastrup | G01N 21/6458 |
| | | | | 385/32 |
| 9,182,348 | B2* | 11/2015 | Zubairy | G01N 21/6456 |
| 9,778,329 | B2* | 10/2017 | Heidmann | G01N 24/10 |
| 9,891,417 | B2 | 2/2018 | Hell et al. | |
| 10,168,521 | B2* | 1/2019 | Takiguchi | G02B 21/0076 |
| 10,429,305 | B2 | 10/2019 | Schoenle et al. | |
| 10,955,348 | B2 | 3/2021 | Hell et al. | |
| 2009/0046298 | A1* | 2/2009 | Betzig | G01N 21/6458 |
| | | | | 356/450 |
| 2015/0196201 | A1* | 7/2015 | Andersson Engels | ....... |
| | | | | G01N 21/4795 |
| | | | | 600/431 |
| 2015/0226950 | A1* | 8/2015 | Booth | G01N 21/636 |
| | | | | 250/459.1 |
| 2016/0139050 | A1* | 5/2016 | Wuite | G02B 21/0076 |
| | | | | 250/459.1 |
| 2017/0082844 | A1* | 3/2017 | Hell | G02B 21/16 |
| 2018/0024342 | A1* | 1/2018 | Biebricher | G02B 27/106 |
| | | | | 250/459.1 |
| 2018/0238804 | A1* | 8/2018 | Schoenle | G01N 21/6428 |
| 2019/0011367 | A1* | 1/2019 | Hell | G02B 21/0072 |

OTHER PUBLICATIONS

Ashkin, Arthur, et al. "Observation of a single-beam gradient force optical trap for dielectric particles." Optics Letters 11.5 (1986): 288-290.

Donnert, Gerald, et al. "Macromolecular-scale resolution in biological fluorescence microscopy." Proceedings of the National Academy of Sciences 103.31 (2006): 11440-11445.

Heller, Iddo, et al. "STED nanoscopy combined with optical tweezers reveals protein dynamics on densely covered DNA." Nature Methods 10.9 (2013): 910-916.

* cited by examiner

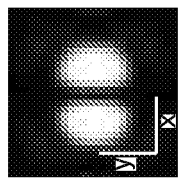 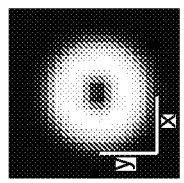 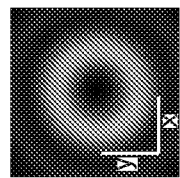
Fig. 3E  Fig. 3F  Fig. 3G
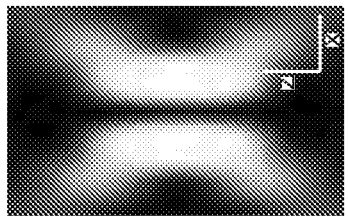 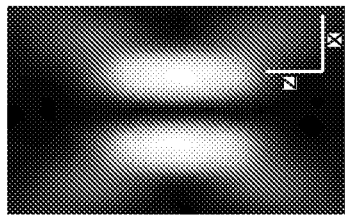 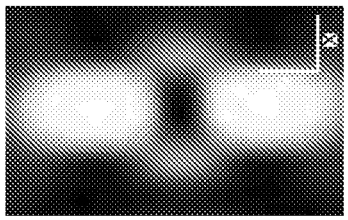
Fig. 3B  Fig. 3C  Fig. 3D
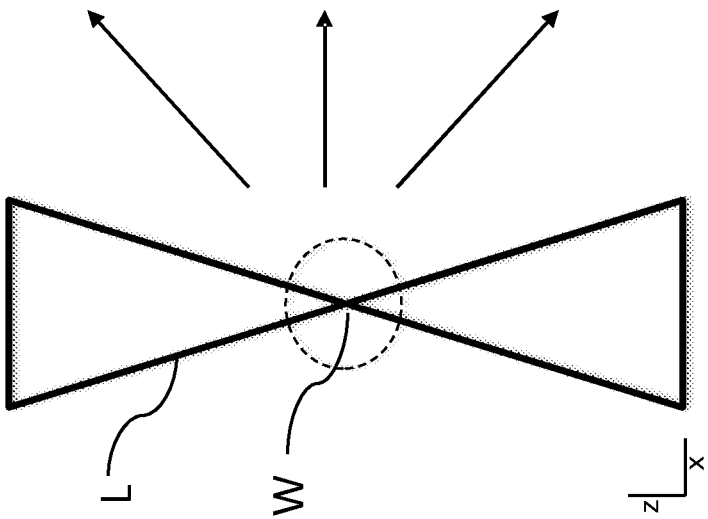
Fig. 3A

MICROSCOPY METHOD AND SYSTEM

TECHNICAL FIELD

The present disclosure relates to systems and methods for microscopy, in particular microscopy including optical excitation and/or de-excitation of sample portions. Particular examples comprise STED (stimulated emission depletion) microscopy and/or microscopy of trapped objects, wherein the trapping may be optically trapping.

BACKGROUND

In microscopy there is a continuous strive towards imaging ever smaller details ever clearer and faster. In particular in microscopy of biological specimens, optical interaction and luminescence have proven to be a very useful and effective tool for detecting particles such as multicellular particles, single cells, organelles, viruses, filaments, DNA-strands, vectors, genes, proteins etc. and/or for detecting interactions between such particles. Optical excitation and deexcitation techniques may further enhance the methods by (locally) modifying luminescence properties of one or more particles and/or their interactions.

Note that optical interaction and luminescence as used in this description refer to any one of bioluminescence, fluorescence, phosphorescence, absorption, selective fusing and/or selective destruction of molecular and/or inter-particle bonds etc. However unless expressly indicated, these terms do not relate to mutilation and/or destruction of the particles themselves or of portions thereof (i.e. no burning, evaporation, etc.).

Over the years various techniques for superresolution imaging have been developed improving observable detail. Also, various trapping mechanisms have been developed which facilitate locating and/or manipulating sample portions. Typical examples of such techniques are disclosed in G. Donnert et al., "Macromoecular-scale resolution in biological fluorescence microscopy", PNAS 103(31):11440-11445 (2006) (DOI: 10.1073/pnas.0604965103) and in I. Heller et al., "STED nanoscopy combined with optical tweezers reveals protein dynamics on densely covered DNA", Nature Methods 10(9):910-916 (2013) (DOI: 10.1038/NMETH.2599).

The combination of optical tweezers and fluorescence microscopy has proven to be highly effective for dynamic single molecule (DSM) studies of complex molecular interactions. Standard widefield or confocal fluorescence microscopy approaches suffer from an imaging resolution limited by optical diffraction. As a result, molecular complexes that are separated by a distance that is smaller than the optical diffraction limit cannot be distinguished and/or features of molecular architectures smaller than this optical diffraction limit cannot be resolved. Stimulated emission depletion (STED) microscopy has proven to be able to break this diffraction limit by making use of active de-excitation of molecules with a doughnut shaped depletion beam (i.e. after excitation of a sample by a standard excitation beam part of the excited molecules are de-excited by a beam with an intentional zero intensity center). By increasing the power of this STED beam and thereby saturating the de-excitation transition, the remaining excited sample can be restricted to in-principle arbitrarily small regions. If this combination of excitation and de-excitation beams is scanned with respect to a sample a high-resolution image can be constructed based on the detected fluorescence light.

Many alternative methods that depend on the same principle but that use different mechanisms for distinguishing the signal from the zero intensity center of a doughnut beam from the signal outside of that center have been disclosed which lead to the same advantage of high-resolution imaging. The aforementioned paper by Heller et al. have demonstrated a 1D STED approach combined with optical tweezers to enable high resolution imaging of molecules that are manipulated by optical traps. This for example enables the creation of high-resolution images of single molecules bound to DNA at high densities and in high background concentrations.

High-resolution STED requires high STED intensities and therefore high laser powers. Typical powers used for a focused STED beam are >1 mW up to 500 mW or higher. It has now been found that such beams may negatively affect the measurement resolution. Thus, further developments in such microscopy techniques are still desired.

Further reference is made to DE 10 2016 117 096, WO 2017/153430 and EP 3 159 676.

SUMMARY

In view of the above, methods and systems are herewith provided as set forth below and in the appended claims.

A method of microscopy according to the present concepts is a method of excitation microscopy, in particular STimulated Emission depletion (STED) microscopy, and comprises providing a sample;

trapping an object in the sample at a trapping position, in particular by applying a position dependent trapping force to the object;

positioning, in particular focusing, a depletion beam at an interaction position in the sample for illumination, in particular for stimulated emission depletion, of a portion of the sample associated with the trapped object.

The method further comprises controlling the depletion beam such that, at least when the depletion beam is positioned at the interaction position, an optical force exerted by the depletion beam on the object causes a displacement of the object less than the optical resolution, preferably less than half the optical resolution of an imaging system for observing a STED fluorescence. Also or alternatively, in case the object is trapped by applying a position dependent trapping force to the object, the method comprises controlling at least one of the depletion beam and the trapping force on the object such that, at least when the depletion beam is positioned at the interaction position, an optical force exerted by the depletion beam on the object is less than 5% of the trapping force, preferably less than 3%, more preferably less than 1%.

The commonly used concept of "trap stiffness", which is typically expressed in units of picoNewton per nanometer for optical traps, is the spatial derivative of the trapping force referred to hereinabove. The optical resolution is defined as the Full Width Half Maximum of the STED point spread function. Note that the terms STED beam and depletion beam may be, and are, used interchangeably.

The portion of the sample associated with the trapped object may be part of the object. It may also be a portion of a body that is attached to the object or that is to become attached to the object, the attachment being either directly to the object or indirectly, via one or more intervening bodies which in turn is/are attached to the object directly or indirectly. The interaction position is thus also associated with the trapped object via the portion of the sample.

The method enables increasing resolution of STED microscopy of (directly or indirectly) trapped objects and/or objects interacting with them, since STED benefits from a high optical intensity of the depletion beam and from an accurate position determination of the interaction position and the sample portion to be studied, e.g. a particle. It has been found that these demands may come into conflict in case of STED microscopy of (directly or indirectly) trapped objects, because a powerful depletion beam may exert an optical force on the object which interferes with the trapping force or -forces. Due to the interference, which may be attractive or repulsive, a position of the trapped object and/or dynamics of the trapped object in the trap may be affected. This may in turn affect sample portions connected with the object with respect to one or more of position, motion, mechanical properties and mechanics-related properties which may comprise tension in a trapped object. Mechanics-related properties may e.g. comprise binding kinetics and/or displacement kinetics of a particle along a DNA strand.

More in particular, a disadvantage of the combination of a standard STED approach with a trap like optical tweezers is the fact that high-resolution STED requires high depletion intensities and therefore high laser powers. Typical powers used for the focused depletion beam are >1 mW up to 500 mW or higher. This typically is not a problem for imaging cells or other structures but it poses a significant problem when the STED beam is scanned over an object held in a trap such as an optical trap: the STED beam in this case can exert unwanted forces on the trapped object, and/or the intense STED beam may perturb the correct detection of forces in the trap in a conventional layout.

In the presently provided methods, controlling the depletion beam such that, at least when the depletion beam is positioned at the interaction position, an optical force exerted by the depletion beam on the object causes a displacement of the object less than the optical resolution, preferably less than half the optical resolution of an imaging system for observing a STED fluorescence, provides that mechanical noise does not noticeably affect the resolution of an image, relative to optical noise; note that these noise sources are added quadratically. The method is applicable for any trapped object having a smaller motion range in the trap than about the optical resolution of the imaging system.

On the other hand, controlling at least one of the depletion beam and the trapping force on the object such that, at least when the depletion beam is positioned at the interaction position, an optical force exerted by the depletion beam on the object is less than 5% of the trapping force, preferably less than 3%, more preferably less than 1%. This is applicable for any trapped object being trapped by application of a position dependent trapping force. The smaller the effect of the depletion beam on the trap, the better the resolution may be. Similarly, the better a relation with a trapping force (and with associated dynamics data on/of the sample) may be.

The method is achievable by reducing an overall power of the STED beam, e.g. by a suitably pulsed operation of a depletion light source, see also below.

Although STED resolution is also affected by other parameters such as optical parameters (e.g. numerical aperture, pixel size, detector sensitivity, etc.) the present concepts are based on the notion that the requirement for high resolution in STED is effective depletion of excited states outside of a region of minimum intensity of the STED beam. This allows controlling the intensity of the depletion beam.

It is to be noted that the concepts as brought forward herein may be equally used and exploited in other types of microscopy on trapped objects, wherein instead of a depletion beam an optical beam for another microscopy purpose is used in combination with a trapped object, e.g. an excitation beam, a destruction beam and/or an ionisation beam.

At least one optical property of the depletion beam may be controlled as a function of at least one of the trapping force and a separation between the trapping position and the interaction position.

Also or alternatively, the trapping force may be controlled as a function of at least one of at least one optical property of the depletion beam and a separation between the trapping position and the interaction position.

Thus, the depletion beam may be controlled relative to the trapping force and/or the other way around. I.e. in case of a higher (lower) trapping force a larger (lesser) optical force of the depletion may be allowed or conversely in case of a very powerful depletion beam (see also below) the trapping force should be increased; also or alternatively the depletion beam and the trapping force may be controlled relative to the separation of the interaction position and the trap position, since the optical force of the depletion beam will have a spatial extent related to the intensity profile of the beam around the interaction position; the closer the interaction position is to the trapping position, the higher the optical force of the depletion beam on the object may be.

The application of the trapping force may comprise applying an optical trapping beam. Also or alternatively, the application of the trapping force may comprise applying an acoustic force. That is, the object may be held in an optical trap and/or in an acoustic trap. Either or both types of trap may provide a trapping force in one or more directions (1-, 2- or 3-dimensional trapping) and/or define particular trapping geometries by particular trapping force field geometries, known per se.

The depletion beam may be provided with at least one optical property, in particular a beam intensity, being pulsed, providing a depletion pulse energy, a depletion pulse duration and a depletion pulse interval or a depletion pulse repetition rate.

When STED is implemented with pulsed lasers, as is often preferred, it is desirable that the STED pulse is able to effectively de-excite all excited states created by the excitation pulse (except for those in the zero-intensity center). This means that what is important for the spatial resolution of STED is to optimize the total number of photons of the depletion beam that can interact with the excited state population within the fluorescence lifetime of said excited state population. In other words, the important parameter is not the time-averaged power of the depletion beam, but the total energy per pulse of the depletion beam (provided that the de-excitation pulse-width does not greatly exceed the fluorescence lifetime). For the optical trapping and force detection, however, it is the average power which is the important parameter irrespective of how this average power is distributed over the independent pulses of a pulse train. This leads to the conclusion that for the combination of STED with optical trapping there can be an advantage to using low repetition rate pulse trains for STED imaging. Thus, for the STED resolution the relevant parameter is the number of STED photons that a molecule "sees" during its relatively short (1-5 ns) excited state lifetime. This determines the depletion efficiency (and therefore the resolution). Lowering the pulse repetition rate but keeping the same pulse duration and energy of the depletion pulses therefore does not affect the resolution.

For the unwanted trapping force exerted by the (non-trapping) depletion beam on the trapped object, however, the pulse energy and duration are irrelevant, as long as the repetition rate is much higher than the inverse of the response time of the trapped object (e.g. a bead) which is characterized by the corner frequency of the power spectrum of the trapped object. In that case it is only the average power of the (non-trapping) depletion beam that determines the force on the trapped object.

The depletion pulses preferably alternate between a maximum intensity and zero intensity. The depletion pulse duration and/or depletion pulse interval may be determined on the basis of a Full Width at Half Maximum (FWHM) pulse intensity value. Within a pulse, the intensity may be constant for some time. The pulses may be substantially identical or differ from each other. A relation between a depletion pulse duration and a depletion pulse interval may be expressed as a duty cycle.

Also or alternatively, the depletion beam may have a pulsed wavelength and/or pulsed intensity, providing a depletion pulse duration and a depletion pulse interval with respect to that optical property, for which the above holds mutatis mutandis.

Also or alternatively, at least one of the depletion beam intensity, the depletion pulse duration and the depletion pulse interval may be controlled. A combination of at least two of these optical properties may determine a depletion pulse power, and/or an average power of the depletion beam.

In particular, for a given pulse energy the average optical force may directly depend on the duty cycle and controlling the depletion pulse interval allows control of the average optical force of the depletion beam on the object. Thus, at least when positioned at the interaction position, a momentary optical force and a time-averaged optical force exerted by the depletion beam on the object may be determined, in particular the time-averaged optical force may form the aforementioned optical force of the depletion beam. Use of short depletion pulses and/or long depletion pulse intervals between successive depletion pulses may allow use of high intensity depletion pulses for the STED, as desired, without negatively affecting the trapping of the object and any associated affecting of the sample. Note that the pulse duration is a relevant factor because it needs to compete with the spontaneous emission lifetime. However, STED is a saturation process, not a standard non-linear process in which higher peak intensities lead to more signal. What is crucial (as long as the pulse is significantly shorter than that lifetime) is the pulse energy (i.e. the number of photons in the pulse).

The depletion beam may be periodically displaced from the interaction position to at least one other position, providing an interaction position duration and an interaction position interval, wherein the method may comprise controlling at least one of the interaction position duration and the interaction position interval. Thus, at least when positioned at the interaction position, a time-averaged optical force exerted by the depletion beam on the object may be determined as the aforementioned optical force of the depletion beam.

The interaction pulse duration and/or interaction pulse interval may be determined on the basis of a stationary position of the beam. The pulse durations may be substantially identical or differ from each other. A relation between an interaction pulse duration and an interaction pulse interval may be expressed as an interaction duty cycle.

In a preferred embodiment, the depletion beam is pulsed at a pulse repetition rate such that the optical power of the depletion beam is lower than the optical power of an optical trapping beam providing the optical trapping force. Such method facilitates providing both a high depletion pulse intensity and a well-controlled trap (or: trapping force).

The depletion beam may be periodically displaced from the interaction position to a trapping position, wherein the depletion beam may be adjusted to apply the trapping force to the object at the trapping position. Thus, one beam may be used for both depletion and applying the trapping force. In such case the interaction duty cycle may readily define a ratio between the trapping force and an optical force of the depletion beam. Similarly, as an inverse, a trapping duty cycle may be defined which may also readily define a ratio between the trapping force and an optical force of the depletion beam.

The object may be a first object, then the method may further comprises trapping at least one second object in the sample at a respective second trapping position by applying a second trapping force to the second object, the first object and the second object preferably being connected with a third object, e.g. an elongated object like a DNA-strand, wherein the interaction position may be located on or near the third object. Thus, the third object may be held between both trapped objects and STED microscopy may be applied to or in association with the second or third object. In particular, then method may further comprise controlling the depletion beam such that, at least when the depletion beam is positioned at the interaction position, an optical force exerted by the depletion beam on the second object causes a displacement of the second object less than the optical resolution, preferably less than half the optical resolution of an imaging system for observing a STED fluorescence. Also or alternatively, the method comprises controlling at least one of the depletion beam and the trapping force on the second object such that, at least when the depletion beam is positioned at the interaction position, an optical force exerted by the depletion beam on the second object is less than 5% of the trapping force, preferably less than 3%, more preferably less than 1%. Also or alternatively, any and all discussed in relation to the (first) object may equally apply to the second object and/or the second trapping force. Thus, the method enables improved control over the trapping force on the second object. Therewith, also improved control over positional and/or mechanic properties of the third object may be achieved; e.g. by improved control over a stretching force along the third object. Note that the third object may be a compound object, e.g. a chain of connected bodies.

The presently provided concepts may be used at different interaction positions within the sample, e.g. for position dependent microscopy. This may be done by sequential application of the method in the respective interaction positions. Also or alternatively, plural depletion beams may be used simultaneously and/or in succession. Such plural depletion beams may be positioned in the same interaction position or in different respective interaction positions. In particular in case of plural depletion beams positioned in the same interaction position, the depletion beams may have a mutually different beam propagation direction and coincide in the interaction position.

In case of plural depletion beams, the method may comprise at least one of:
  controlling at least one of the further depletion beams such that, at least when the further depletion beam is positioned at its respective interaction position, an optical force exerted by the further depletion beam on the object causes a displacement of the object less than the optical resolution, preferably less than half the optical resolution of an imaging system for observing a STED fluorescence; and controlling at least one of the further depletion beam and the trapping force on the object such that, at least when the further depletion beam is positioned at the interaction position, an optical force exerted by the further depletion beam on the object is less than 5% of the trapping force, preferably less than 3%, more preferably less than 1%.

For any and each such further depletion beam the same holds as explained above for one depletion beam. Thus, influencing of the plural depletion beams of the trapping of the object may be controlled and be reduced or even prevented.

Any embodiment of the presently disclosed methods may further comprise capturing image data, e.g. luminescence data, representative of at least a portion of the sample, in particular capturing the image data as a function of at least one of time, the trapping force, at least one optical property of the depletion beam, the interaction position and a separation between the trapping position and the interaction position. Also or alternatively the methods may comprise capturing image data as a function of time, sample properties etc. In particular the methods may further comprise measuring a trapping force, a force exerted onto an object and in particular a tension on an object connected to two trapped objects. A preferred combination is capturing image data and trapping force data simultaneously on one or more objects held in an optical trap using STED.

A trapping force on the object may be determined, preferably as an early or initial method step, as a function of at least one optical property of a trapping beam trapping the object, e.g. a trapping beam power, a focus position within the sample and/or a focus tightness etc.

An optical force exerted by the depletion beam on the object may be determined, preferably as an early or initial method step, as a function of at least one optical property of the depletion beam, in particular as a function of at least one of separation between the interaction position and a position of the object, in particular a trapping position. Also or alternatively an optical force exerted by the depletion beam on the object may be determined as a function of other sample parameters and/or method parameters, e.g. as a function of an optional functionalisation of the object and/or as a function of attachment of further objects to the object, directly and/or indirectly. Such characterisation facilitates accurate control of and/or throughout experiments.

Further, and in accordance with the above, a microscopy system is herewith provided. The system comprises:
a sample holder for holding a sample;
a trapping source configured to apply a trapping force to an object at a trapping position in the sample, in particular a position dependent trapping force;
a depletion light source configured to provide, in particular to focus, a depletion beam at an interaction position in the sample for illumination of a portion of the sample associated with the trapped object;
a controller connected with the depletion light source, and preferably being connected with at least one of the trapping source, a detector configured to determine the trapping force, and a detector configured to determine a separation between the trapping position and the interaction position.

The controller is configured to control the depletion light source such that, at least when the depletion beam is positioned at the interaction position, an optical force exerted by the depletion beam on the object causes a displacement of the object less than the optical resolution, preferably less than half the optical resolution of an imaging system for observing a STED fluorescence. Also or alternatively, in case the trapping source is configured to trap the object at a trapping position in the sample by applying a trapping force to the object, the controller is configured to control at least one of the depletion beam and the trapping force on the object such that, at least when the depletion beam is positioned at the interaction position, an optical force exerted by the depletion beam on the object is less than 5% of the trapping force, preferably less than 3%, more preferably less than 1%.

The system provides increased spatial and/or force resolution by reducing or preventing interference of the trapping of the object by the depletion beam. A force detection may be left substantially undisturbed. In case of plural connected objects ow which at least one is trapped tension control may be improved. Note that tension may be achieved between portions of an object or series of objects on whidth different forces are acting. The method may also prevent objects, e.g. beads, being pulled from the trap and/or other undesired manipulation of the sample.

The controller may be configured to control at least one optical property of the depletion beam as a function of at least one of the trapping force and a separation between the trapping position and the interaction position. Thus, any separation effect between the depletion beam and the trapped object may be addressed and taken account of.

The trapping source may comprise a light source, in particular a laser. This enables optically trapping of the object, which has shown to be a powerful and versatile technique. Further, trapping forces in optical traps may be determined quite accurately using well-known techniques, e.g. back focal plane interferometry.

The system may be configured for simultaneously trapping plural objects with respective trapping light beams. These may be provided by a single laser via suitable optical techniques, known per se. Similarly, the system may be configured for simultaneously providing plural depletion beams. Plural trapping beams, and/or, respectively, plural depletion beams may be provided by a single laser via suitable optical techniques, known per se.

The trapping source may comprise an acoustic generator, in particular an ultrasound generator, for generation of an ultrasound force onto the object. Acoustic trapping systems have been proven to be versatile traps and/or manipulators of biological samples.

The controller may comprise an oscillator, configured to provide a depletion beam as a pulsed beam, e.g. being configured to provide at least one of a depletion beam and an excitation beam as a pulsed beam, e.g. being configured to operate the depletion light source and/or an excitation light source in a pulsed mode. Thus, the depletion beam and or an excitation beam may be operated to provide a relatively intense depletion beam at a relatively low average power. Although the oscillator may be fixed-frequency oscillator, preferably the oscillator is a controllable oscillator, facilitating adaptation of a pulse frequency, or in other words varying a pulse repetition rate. Note that the optical power of a pulsed beam is the product of the pulse energy of the pulses and the pulse repetition rate. A suitable oscillation frequency enables operation of the depletion beam with a high intensity for powerful STED but at the same time with a low (average) power for reduction or prevention of affecting the trap.

The system may comprise at least one of a detector to produce an image of a focal plane in a sample in the sample holder, which may be a digital detector; and a position dependent detector for determining an optical trapping force. The former facilitates recording an image, as is a basic concept of microscopy, the latter facilitates studying sample properties as a version of force microscopy.

BRIEF DESCRIPTION OF THE DRAWINGS

The above-described aspects will hereafter be more explained with further details and benefits with reference to the drawings showing a number of embodiments by way of example.

FIGS. 3A-3G indicate a laser beam focused to a waist W, wherein FIG. 3A is very schematic, FIGS. 3B-3D indicate a side view of the beam intensity at and near the waist W and FIGS. 3E-3G indicate a cross section through the waist for the three different beam shapes of FIGS. 3B-3D;

DETAILED DESCRIPTION OF EMBODIMENTS

Figure 2:
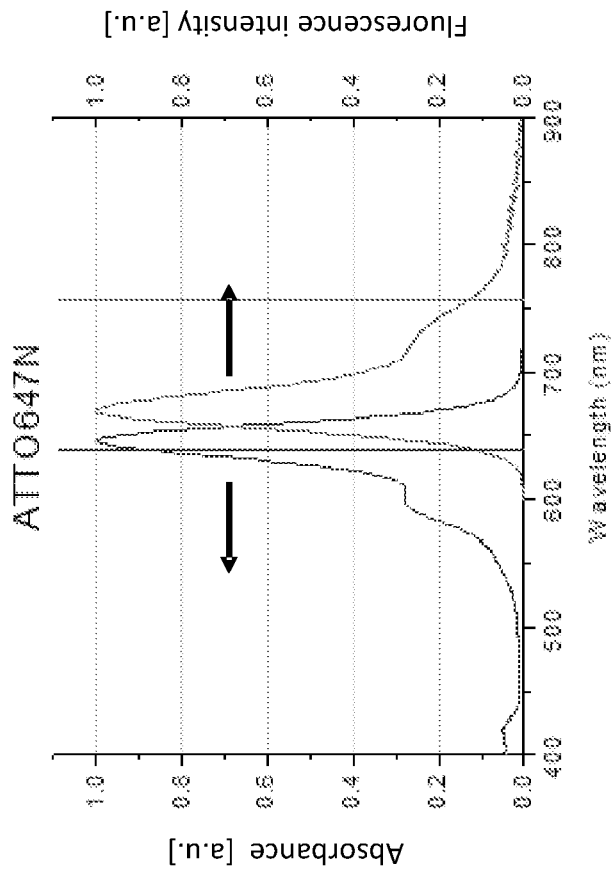
FIG. 2 shows an absorption spectrum (left) and a fluorescence spectrum (right) of ATTO 647N; the vertical lines mark typical excitation (left) and depletion (right) wavelengths, respectively.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, where helpful individualised with alphabetic suffixes.

Further, unless otherwise specified, terms like "detachable" and "removably connected" are intended to mean that respective parts may be disconnected essentially without damage or destruction of either part, e.g. excluding structures in which the parts are integral (e.g. welded or molded as one piece), but including structures in which parts are attached by or as mated connectors, fasteners, releasable self-fastening features, etc. The verb "to facilitate" is intended to mean "to make easier and/or less complicated", rather than merely "to enable".

FIGS. 1-6B indicate different aspects of a STED (stimulated emission depletion) microscopy system.

In STED microscopy generally a confocal laser scanning microscope is modified to add a depletion beam, commonly also referred to as "STED beam", which overlaps spatially with the confocal excitation beam, at least in an interaction position, although both beams may coincide along significant portions of a beam path. Whereas the confocal excitation beam may be on resonance with an (expected) excitation transition or be blue detuned to it, a depletion beam generally has a wavelength corresponding to the red tail of a luminescence spectral range, in particular a fluorescence spectral range, of a luminescent portion used for imaging. Typically, the luminescent portion comprises a dye.

Figure 1:
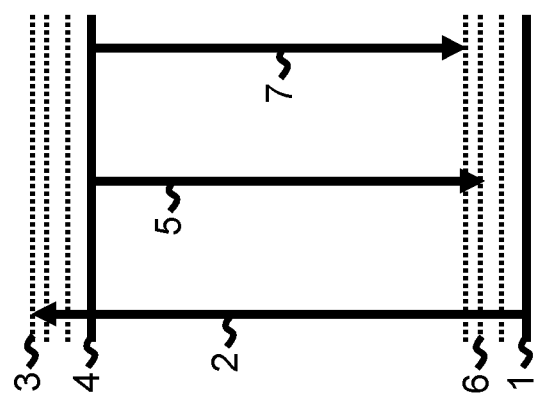
FIG. 1 shows a schematic level diagram (Jablonski diagram) of molecular energy states and radiative transitions.

When a molecule is excited to an excited state by some process, e.g. optical excitation such as possibly provided by an excitation optical beam as just described, the molecule may de-excite to a lower state by radiative emission processes. Such excited molecule may generally be pumped back down to the lower state, or even a ground state, by forcing stimulated emission of radiation from the molecule using light having one or more suitable wavelengths. In STED this is done using the depletion beam. This is indicated in FIG. 1, which shows a schematic of the electronic and vibrational energy levels of an exemplary fluorescent dye molecule, e.g. the fluorescent labelling dye "ATTO-647N", developed for the red spectral region, available from ATTO-TEC, GmbH, Germany. The molecule is normally in the electronic ground state (1). By absorption of a photon from an excitation pulse (2) the molecule can be excited to a vibrational level (3) of an excited state, also known as a fluorescent state (4). After fast vibrational relaxation occurs in the fluorescent state, normally a radiative decay (5) may occur by which spontaneous emission of a photon occurs, the photon having a longer wavelength than the excitation wavelength. This is called fluorescence. Typically, the decay occurs from the lowest vibrational state of the excited state level (4) to one of the vibrationally excited levels (6) of the electronic ground state. From there, the molecule may further decay towards the ground state.

The fluorescence (5) can be prevented by actively depleting the excited state. This can be done by irradiating the molecule in the excited state with light at a wavelength that stimulates decay (7) from the lowest vibrational state of the excited state level to one of the vibrationally excited levels of the ground state by emission of a photon (stimulated emission), thus depleting the excited state.

FIG. 2 shows, as an example, that the dye ATTO-647N can be excited by light having a wavelength of 640 nm and be depleted by light having a wavelength of 767 nm.

The depletion beam may have a particular intensity pattern or point spread function. The point spread function of the depletion beam may be modified by inserting a phase mask into the beam path.

FIGS. 3A-3G indicate a laser beam L focused to a waist W. FIGS. 3B-3D indicate a side view of the beam intensity at and near the waist W and FIGS. 3E-3G indicate a cross section through the waist W for three different beam shapes, see below.

As indicated in FIGS. 3B-3G for STED, a general idea is to create a local intensity minimum in the depletion beam, preferably a region of (near) zero intensity and preferably in a center of the depletion beam; when directly after an excitation process, e.g. an excitation light pulse, the depletion beam arrives at the excited molecules its light will de-excite the molecules. Provided that the beam has sufficient intensity, substantially all spontaneous fluorescence may be suppressed in the illuminated area(s), whereas in the region of the local intensity minimum molecules may be unaffected and remain excited, exhibiting a natural fluorescence behaviour.

Different phase masks, or other optical elements and/or optical techniques, may lead to respectively a two-dimensional ("2D") plane of (near) zero intensity, e.g. an XY-plane, see FIGS. 3B, 3E; a one-dimensional ("1D") line of (near) zero intensity, also known as a doughnut beam, see FIGS. 3C, 3F; and a volume of (near) zero intensity surrounded on all sides by a relatively high intensity ("dark spot" or "dark point"), see FIGS. 3D, 3G. The markings in the FIGS. 3B-3G are scale bars of about 500 nanometers, giving an indication of the beam waist size. Note that an important point of STED is that it aims to provide a nearly infinitesimally small position of zero intensity surrounded by extremely rapidly increasing intensity for depleting excited molecules.

By depleting a significant portion of the volume excited by the excitation process, preferably substantially all of the volume, except for the intensity minimum of the depletion beam, only a small volume of the sample may be left to fluoresce, which fluorescence may be observed. For such observation, the depletion beam wavelength may be (wavelength) filtered from an imaging path. Since the relative size of the local minimum intensity is imprinted on the STED beam intensity profile per se, the size is reduced together with the overall beam size at the focus, thus it is significantly smaller than the beam waist, so that the volume of molecules left to fluoresce may be exceedingly small, the surrounding molecules being quenched by the intense portions of the STED beam. Thus the spatial resolution of a fluorescence-based imaging process may be increased.

The cross-section for stimulated emission of molecules tends to be low, so that high intensities are required to achieve significant depletion, i.e. the excited state molecule needs to "see" many photons to have a significant chance to be depleted. The present concepts are based on the realisation that most excited states of radiating transitions tend to have rather short life times; therefore, the intensity of the depletion beam rather than the power of the depletion beam is decisive for effectiveness of the STED technique; as long as the depletion pulse is significantly shorter than the spontaneous fluorescence lifetime, the pulse energy, i.e. the number of photons is decisive. Hence, an intense beam is desired at the depletion volume, having an intensity minimum at the position of interest.

Note that in this text, the "interaction position" means a position of highest desired interaction possibility. Generally this may coincide with the centre of a beam focus in the sample. In case of the depletion beam having an intensity minimum, the interaction position will generally be the position of the minimum intensity in the sample. In case of plural beams coinciding in the sample, the interaction position will generally be the position of best overlap in the sample.

Figure 4:
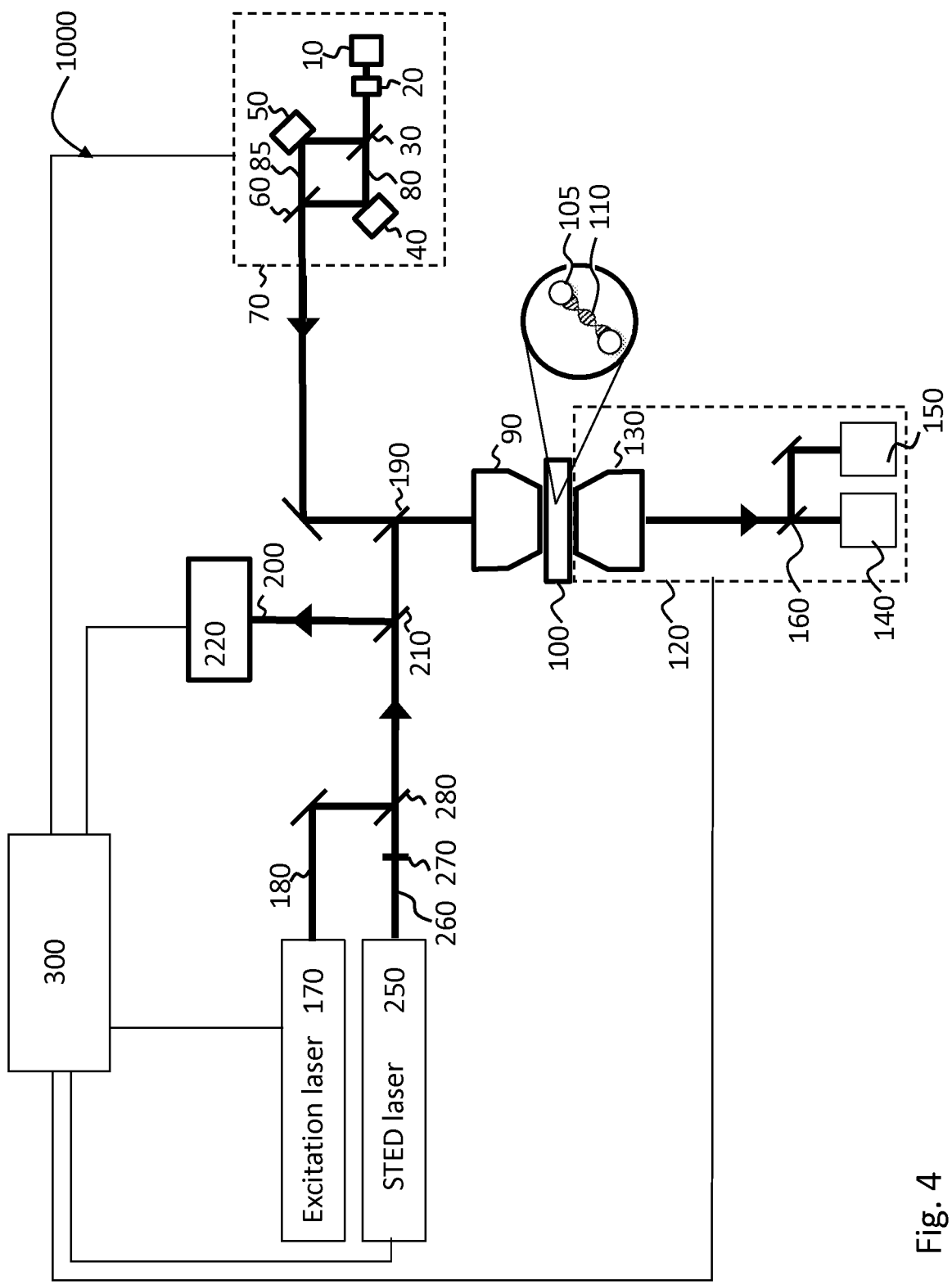
FIG. 4 indicates an embodiment of a microscopy system.

FIG. 4 schematically illustrates an embodiment of a microscopy system 1000 according to the present concepts.

The system 1000 comprises a sample holder 100 for holding a sample, a trap system 70, an excitation system, a depletion system, an imaging detector 220 and a controller 300 as an option being connected to each of these systems (only partly shown).

The optical system 1000 comprises a trap system 70 for establishing an optical trap that can hold an object such as a bead 105 to which a an object such as a DNA strand 110 may be connected; in particular, the trap system may be configured for a dual optical trap holding two objects 105 simultaneously with the further object 110 connected between them.

Optical traps are known in the prior art. An example of an optical trap is described in Ashkin A, Dziedzic J M, Bjorkholm J E, Chu S (1986) Observation of a single-beam gradient force optical trap for dielectric particles. Opt Lett 11:288. doi: 10.1364/OL.11.000288. Typical bead sizes ranges used in optical experiments may vary from 100 nm to 5 micrometer.

In one embodiment, the trap system 70 comprises a trap light source 10 for generating trapping light. The trap light source 10 may be a laser, e.g. a 10 W 1064 nm CW fiber laser, although numerous other types of laser sources are suitable as well. Further, trap system 70 may comprise various optical elements such as a module 20 for rotating the polarization of the trapping light and a polarizing beam splitter 30 for splitting the trapping light into two light beams 80, 85, one for establishing a first trap and a second for establishing a second trap. In each trap, the trapping light 80, 85 provides an optical trapping force onto the bead 105 by which the bead 105 is held in the trap.

The trap system 70 may comprise a module 40 for controlling the position of the first trap and a module 50 for controlling the position of the second trap. In particular, independent trap steering may be done via a coarse-positioning piezo stepper mirror in one of the modules 40, 50 and an accurate piezo mirror for the respective traps, in the other one of the modules 40, 50. A polarizing beam splitter 60 may be used to recombine the individually controlled trapping beams. The trapping beams are focused by an objective 90 into the sample holder 100 containing a sample, here containing beads 105 with the strand 110. If the trap system 70 is configured to establish two traps, as shown, advantageously the object of interest 110 in the sample can be held fixed between two optically trapped object such as beads 105.

The optical system 100 comprises a force detection system 120, that is configured to detect a force exerted by at least one of the traps established by trap system 70 on a trapped object. The force detection system 120 shown comprises a condenser lens 130 that collimates the trapping beams and directs them towards a force detection module 140 for detecting a force exerted by the first trap and optionally a force detection module 150 for detecting a force exerted by the second trap. As known in the art, these modules 140 and 150 may be position dependent sensors as the force can be determined based on a deflection of the trapping light and using back-focal plane interferometry. A polarizing beam splitter 160 may be used to separate the trapping beams from the first and second traps.

The optical system 1000 may further comprise an excitation optical system comprising an excitation light source 170, such as an excitation laser having a suitable wavelength. In particular, for exciting molecules ATTO-647N a laser having a wavelength of 639 nm may be used. The excitation optical system 170 is configured to focus excitation light 180 onto the sample portion of interest (here: strand 110) through the objective, for example by reflection of an optional dichroic mirror 190. The excitation light 180 may excite molecules in the sample. These excited molecules may subsequently decay and emit a photon. Fluorescence emission 200 may be collected by the objective 90 and may be directed towards a detector 220, e.g. by dichroic mirrors 190 and 210. The detector may comprise an avalanche photodiode, a photomultiplier, but a (possibly digital) camera or other detector is also conceivable.

The optical system 1000 further comprises a depletion light source 250, e.g. a laser, in particular, for depleting excited molecules ATTO-647N a laser having a wavelength of 767 nm may be used. The depletion light source 250 generates a depletion beam 260 which passes through an optional optical beam shaping element, e.g. a phase mask 270, which may imprint a desired intensity pattern on the beam, e.g. determining a local intensity minimum in the beam focus. In this example beam path of the depletion beam 260 is combined and overlapped with the excitation beam at a dichroic mirror 280, but a polarizing beam splitter or other combiner may also be used.

Figure 5:
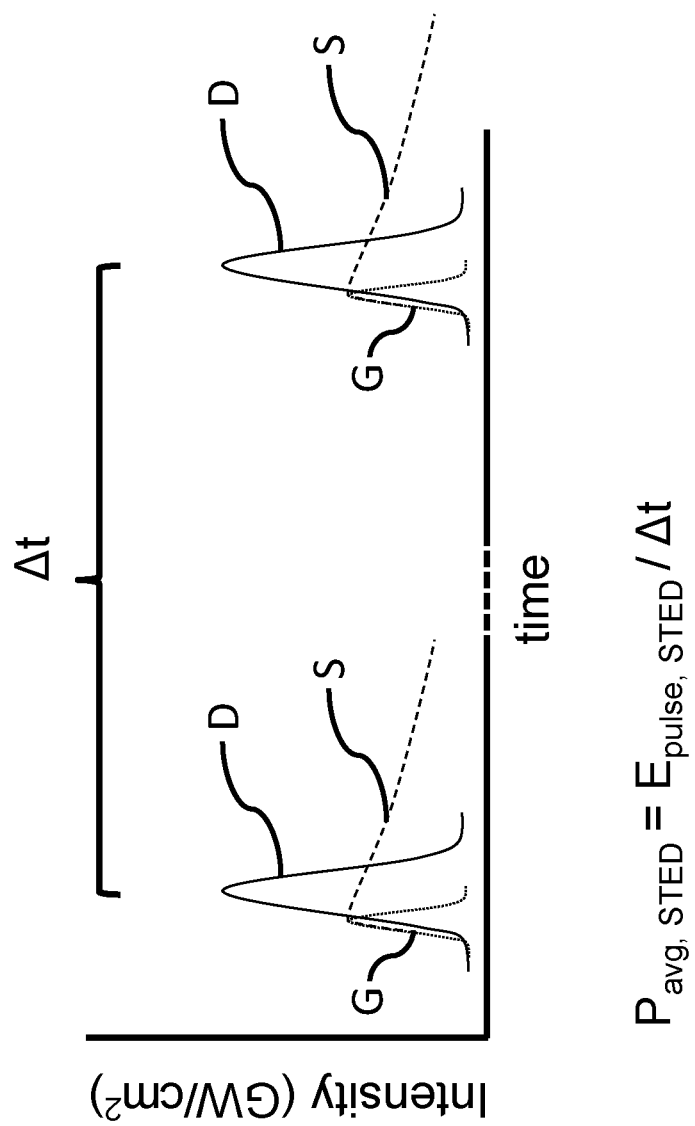
FIG. 5 shows a STED pulse sequence.

FIG. 5 schematically shows a typical pulse sequence in pulsed STED microscopy. The pulse intensity (measured in GW/cm2) is plotted as a function of time. The dotted line indicates an excitation generation pulse G (excitation beam 180), the dashed line indicates a spontaneous fluorescence signal S, the solid line indicates the depletion pulse D (depletion beam 260). The relative intensity of the STED beam is typically much higher than that of the excitation beam so the sketched pulse heights are not to scale. Clearly, the sample is first illuminated by an excitation generation pulse G to excite the molecules. Then, the sample is illuminated by the depletion pulse D, which is more intense than the excitation generation pulse G and which may also last longer. The fluorescence signal from the molecules shows a typical natural decay. Preferably the depletion pulse D is kept shorter than the (expected) fluorescence signal S so that the STED depletion can compete with spontaneous emission.

The spatial resolution of the system, which is a very important parameter in microscopy, is determined by the optical parameters of the system such as the Numerical Aperture of the objective, the excitation and detection wavelengths, the detection pinhole size, as well as the total energy in the STED pulse, $E_{pulse,\ STED}$. The average power of the STED beam, $P_{avg,\ STED}$ depends on the pulse energy and the pulse-to-pulse period $\Delta t$ of the pulse train. The average power of the depletion beam is a determining factor in the effective optical force of the depletion beam on any object in the sample and thus of the risk of affecting the intended trapping force. Note that a trapped bead, in particular a trapped bead in a fluid, may have a so-called corner frequency and/or a bead response time, which enable that trap modifications/trapping force modifications occur on a significantly faster time scale than can be followed by the bead; effectively, the bead is largely insensitive to such rapid signals/signal modifications.

In a preferred embodiment the present method relies on balancing the pulse-to-pulse period $\Delta t$, and the depletion pulse energy $E_{pulse,\ STED}$, to prevent a too high average power of the STED beam, $P_{avg,\ STED}$. Note that the averaging time may be taken as long as desired, but typically this will be for a duration of several pulses, corresponding to the time a particular interaction position is (to be) studied and/or the depletion beam is close to a trapped object (e.g. a bead 105). Note that normally, excitation pulses G and depletion pulses D may be on the order of hundreds of picoseconds to nanoseconds, and the fluorescence signal may be on the order of 1 to 10 nanoseconds. A pulse repetition rate (G,D) of a few MegaHertz, e.g. <10 MHz, such as <5 MHz or even <2 MHz at a numerical aperture of 1.2 or higher may therefore provide a balance between low average power $P_{avg,\ STED}$, high fluorescence signal strength, and fast data acquisition, possibly enabling studying dynamics of the sample.

The depletion pulse duration may be tuned to effectively compete with the spontaneous fluorescence lifetime while minimizing peak intensity to avoid multi-photon processes which might contribute to photobleaching.

Figure 6A:
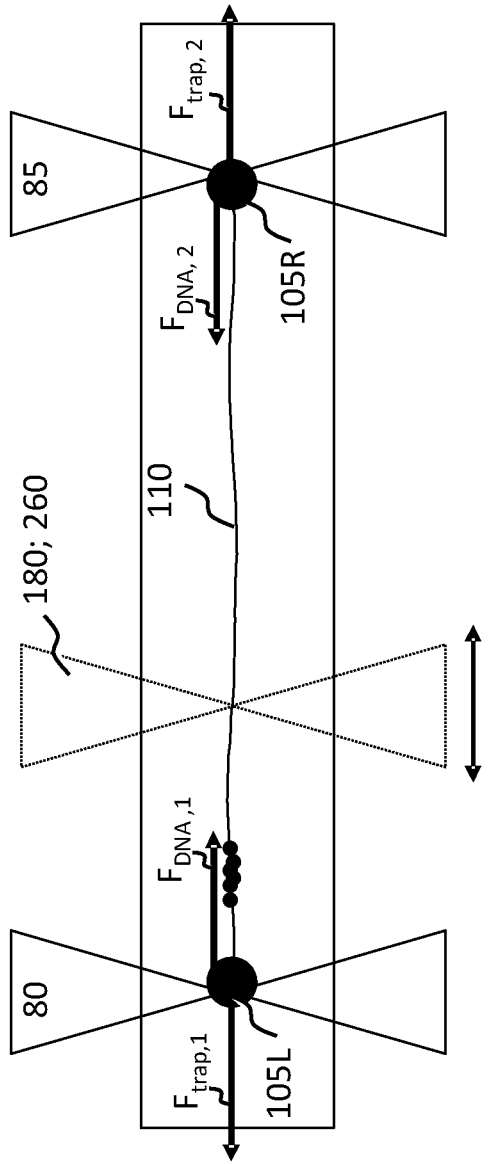
FIGS. 6A and 6B show two situations of STED microscopy on an elongated molecule connected on opposite ends to beads held in a dual optical trap.
Figure 6B:
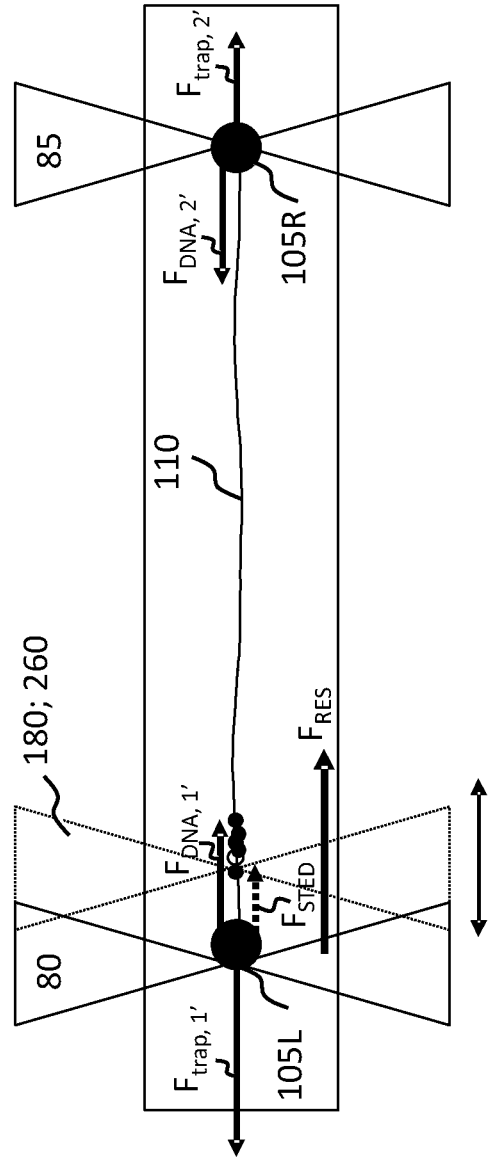

FIGS. 6A, 6B depict a long DNA molecule 110 tethered between two beads 105L, 105R held in two trapping beams 80, 85 (solid triangles). Excitation beam 180 and STED beam 260, having coinciding beam paths at the location of the sample and together being indicated by the dotted triangles, scan the molecule 110. The STED 260 beam is significantly more intense and hence powerful than the excitation beam 180. When the STED beam 260 has a large separation from the beads 105L, 105R (as shown in FIG. 6A) the bead 105L in the left trap and the bead 105R right trap, respectively, are pulled inward by a similar amount by the elastic force of the DNA molecule 110. These forces are opposed by the respective trapping forces ($F_{trap,\ 1} = F_{DNA,\ 1} = F_{DNA,\ 2} = -F_{trap,\ 2}$). When the separation reduces and the STED beam 260 is close to one of the beads, e.g. left bead 105L, see FIG. 6B, and the STED average power is large relative to the trapping beam power which relates to the trapping beam force (e.g. $P_{STED} > 0.01 * P_{trap}$) the STED beam 260 can exert a force on the bead ($F_{STED}$) that affects the trap balance and disturbs the measurement. In the case sketched in FIG. 6B, the force exerted by the STED beam 260 combines with the force of the DNA to a resultant force $F_{RES}$ which pulls the left bead 105L farther to the right. As a result, dynamics of the bead 105L may differ. But more importantly, the DNA molecule 110 may be stretched less and relax somewhat, reducing its pulling force on the right bead 105R as well, and possibly affecting binding properties of atoms, molecules, proteins, viruses, etc. onto the DNA molecule 110. Simultaneously the detected force on bead 105L is increased (this force is the same magnitude as the sum of the DNA and the STED force). It has been found that such effects may be non-negligible and must be prevented to enable accurate manipulation and measurement of mechanical properties of the sample while simultaneously achieving high spatial resolution for STED imaging.

For beads 105 with a diameter in a range of 500 nanometers-5 micrometers, the trapping force at a trapping wavelength 1064 nm, and a STED wavelength of 767 nm, the optical force on the beads 105 tends to be similar for similar beam sizes and powers.

Note that if more than one depletion beam is used and/or other beams are used, the sum of all forces on the respective beads should be determined and controlled, e.g. by reducing a pulse repetition rate of one or more of the relevant beams. It is further noted that several techniques for determination of an optical force on an object in a sample such as e.g. a bead are nowadays commonly known, e.g. using rear focal plane interferometry.

The disclosure is not restricted to the above described embodiments which can be varied in a number of ways within the scope of the claims. For instance the force from a depletion beam may be repulsive to the object, rather than attractive. Also in that case suitable control is desired, e.g. to prevent overstretching of a tethered molecule.

Various embodiments, e.g. with respect to the controlling, may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

Elements and aspects discussed for or in relation with a particular embodiment may be suitably combined.

The invention claimed is:

1. A method of excitation microscopy comprising:
providing a sample;
trapping an object in the sample at a trapping position by applying a position dependent trapping force to the object;
applying a depletion beam at an interaction position in the sample for illumination of a portion of the sample associated with the trapped object; and
wherein the method comprises at least one of:
controlling the depletion beam such that, when the depletion beam is applied at the interaction position, an optical force exerted by the depletion beam on the object causes a displacement of the object that is less than an optical resolution of an imaging system for observing a Stimulated emission depletion fluorescence; and
controlling at least one of the depletion beam and the position dependent trapping force on the object such that, when the depletion beam is applied at the interaction position, the optical force exerted by the depletion beam on the object is less than 5% of the trapping force.

2. The method of claim 1, comprising controlling at least one optical property of the depletion beam as a function of at least one of the trapping force and a separation between the trapping position and the interaction position.

3. The method of claim 1, wherein the application of the trapping force comprises applying an optical trapping beam.

4. The method of claim 1, wherein the application of the trapping force comprises applying an acoustic force.

5. The method of claim 1, further comprising controlling at least one of the depletion beam intensity, the depletion pulse duration or the depletion pulse interval, wherein at least one optical property of the depletion beam includes being pulsed, a depletion pulse power, a depletion pulse duration and a depletion pulse interval.

6. The method of claim 1, further comprising displacing the depletion beam periodically from the interaction position to at least one other position,
providing an interaction position duration and an interaction position interval, and
controlling at least one of the interaction position duration and the interaction position interval.

7. The method of claim 1, wherein the object is a first object and the method comprises trapping at least one second object in the sample at a respective second trapping position different from a trapping position of the first object, by applying a second trapping force to the second object, the first object and the second object being connected with a third object, and wherein the interaction position is located near the third object.

8. The method of claim 1, wherein the method comprises providing one or more further depletion beams at respective interaction positions, and
at least one of:
controlling at least one of the further depletion beams such that, at least when the further depletion beam is applied at its respective interaction position, an optical force exerted by the further depletion beam on the object causes a displacement of the object less than the optical resolution of an imaging system for observing a STED fluorescence; and
controlling at least one of the further depletion beam and the trapping force on the object such that, at least when the further depletion beam is applied at the interaction position, an optical force exerted by the further depletion beam on the object is less than 5% of the trapping force.

9. The method of claim 1, comprising determining, one or more of a trapping force applied to the object; and an optical force exerted by the depletion beam on the object; and wherein the optical force exerted by the depletion beam on the object is determined as a function of at least one optical property of the depletion beam.

10. A microscopy system for use in the method of claim 1, comprising:
a sample holder for holding the sample;
a trapping source configured to trap the object at the trapping position in the sample by applying a position dependent trapping force;
a depletion light source configured to provide the depletion beam at the interaction position in the sample for illumination of the portion of the sample associated with the trapped object;
a controller connected with the depletion light source,
wherein the controller is configured
to control the depletion light source such that, when the depletion beam is applied at the interaction position, the optical force exerted by the depletion beam on the object causes a displacement of the object less than an optical resolution of an imaging system for observing a Stimulated Emission Depletion fluorescence; and
to control at least one of the depletion beam and the trapping force on the object such that, when the depletion beam is applied at the interaction position, the optical force exerted by the depletion beam on the object is less than 5% of the trapping force.

11. The method of claim 1, wherein
the excitation microscopy is a STimulated Emission Depletion (STED) microscopy;
the trapping step comprises applying a position dependent trapping force to the object; and
the applying step comprises focusing the depletion beam.

12. The method of claim 3, wherein the depletion beam is pulsed at a pulse repetition rate such that an optical power of the depletion beam is lower than an optical power of an optical trapping beam providing the optical trapping force.

13. The method of claim 5, wherein the beam intensity of the depletion beam is pulsed.

14. The method of claim 6, wherein the depletion beam is periodically displaced from the interaction position to a trapping position and wherein the depletion beam is adjusted to apply the trapping force to the object at the trapping position.

15. The microscopy system of claim 10, wherein the controller is configured to control at least one optical property of the depletion beam as a function of at least one of the trapping force and a separation between the trapping position and the interaction position.

16. The microscopy system of claim 10, wherein the trapping source comprises a light source.

17. The microscopy system of claim 10, wherein the trapping source comprises an acoustic generator, for generation of an ultrasound force onto the object.

18. The microscopy system of claim 10, wherein the controller comprises an oscillator configured to provide at least one of a depletion beam and an excitation beam as a pulsed beam.

19. The microscopy system of claim 10, comprising at least one of:
- a detector to produce an image of a focal plane in a sample in the sample holder; and
- a position dependent detector for determining an optical trapping force.

20. The microscopy system of claim 16, wherein the controller is configured to control operation of the depletion light source at a pulse repetition rate such that the optical power of the depletion beam is lower than the optical power of an optical trapping beam providing the optical trapping force.

\* \* \* \* \*